United States Patent
Henry (10) Patent No.: US 8,683,542 B1
(45) Date of Patent: Mar. 25, 2014

(54) CONCEALMENT OF ERRORS IN HTTP ADAPTIVE VIDEO SETS

(75) Inventor: Michael J. Henry, Damascus, OR (US)

(73) Assignee: Elemental Technologies, Inc., Portland, OR (US)

( * ) Notice: Subject to any disclaimer, the term of this patent is extended or adjusted under 35 U.S.C. 154(b) by 214 days.

(21) Appl. No.: 13/412,954

(22) Filed: Mar. 6, 2012

(51) Int. Cl.
*H04N 7/167* (2011.01)

(52) U.S. Cl.
USPC ........ 725/146; 725/93; 375/240.27; 370/358; 370/391

(58) Field of Classification Search
USPC ............... 725/146, 93; 709/204; 375/240.27, 375/240.12, 240.02, 240.26; 370/391, 358; 712/300
See application file for complete search history.

(56) References Cited

U.S. PATENT DOCUMENTS

| | | | | |
|---|---|---|---|---|
| 8,284,845 B1 * | 10/2012 | Kovacevic et al. | ....... | 375/240.26 |
| 2004/0221143 A1 * | 11/2004 | Wise et al. | ..................... | 712/300 |
| 2008/0005246 A1 * | 1/2008 | VanBuskirk et al. | ......... | 709/204 |
| 2010/0150232 A1 * | 6/2010 | Nguyen et al. | ........... | 375/240.12 |
| 2012/0314762 A1 * | 12/2012 | Herrmann et al. | ....... | 375/240.02 |

OTHER PUBLICATIONS

"Adaptive bitrate streaming", http://en.wikipedia.org/wiki/Adaptive_bitrate_streaming, 5 pages, Jan. 13, 2012.
Ozer, Jan, "What is Adaptive Streaming?", Streaming Media, 4 pages, Apr. 28, 2011.
R. Pantos, "HTTP Live Streaming: draft-pantos-http-live-streaming-07", http://tools.ietf.org/html/draft-pantos-http-live-streaming-07, Sep. 30, 2011, pp. 1-33.

* cited by examiner

*Primary Examiner* — Le H Luu
(74) *Attorney, Agent, or Firm* — Christopher P. Maiorana, PC (57) ABSTRACT

A system including one or more stream sources and a stream controller. The one or more stream sources may be configured to generate a plurality of input streams containing a given content at a plurality of bitrates, a plurality of resolutions, or a plurality of bitrates and resolutions. The stream controller may be configured to generate a plurality of output streams in response to the plurality of input streams. The stream controller may be further configured to (i) determine when one of the plurality of input streams becomes invalid, (ii) switch generation of an output stream associated with the invalid input stream from the invalid input stream to a valid one of the plurality of input streams, and (iii) when the invalid input stream becomes valid again, switch the generation of the output stream back to the now valid input stream.

19 Claims, 5 Drawing Sheets

CONCEALMENT OF ERRORS IN HTTP ADAPTIVE VIDEO SETS

FIELD OF THE INVENTION

The present invention relates to digital video and audio generally and, more particularly, to a method and/or architecture for concealment of errors in HTTP adaptive video sets.

BACKGROUND OF THE INVENTION

In order to provide real-time Hypertext Transport Protocol (HTTP) adaptive bitrate conversion, streams containing the same content need to be generated at several different bitrates and/or resolutions. In order to provide real-time processing, all of the stream sources need to provide continuous, error-free video and audio material for the entire duration of an event. If a stream becomes invalid, viewing of a program can be interrupted.

It would be desirable to implement a method and/or architecture for concealment of errors in HTTP adaptive video sets.

SUMMARY OF THE INVENTION

The present invention concerns a system including one or more stream sources and a stream controller. The one or more stream sources may be configured to generate a plurality of input streams containing a given content at a plurality of bitrates, a plurality of resolutions, or a plurality of bitrates and resolutions. The stream controller may be configured to generate a plurality of output streams in response to the plurality of input streams. The stream controller may be further configured to (i) determine when one of the plurality of input streams becomes invalid, (ii) switch generation of an output stream associated with the invalid input stream from the invalid input stream to a valid one of the plurality of input streams, and (iii) when the invalid input stream becomes valid again, switch the generation of the output stream back to the now valid input stream.

The objects, features and advantages of the present invention include providing a method and/or architecture for concealment of errors in HTTP adaptive video sets that may (i) allow an end-user to view programs without interruption, (ii) replace an invalid stream with the same content from a valid lower bitrate and/or resolution stream, (iii) use dynamic manifest manipulation, and/or (iv) provide stream failure recovery without requiring a playback device to be able to seamlessly switch to lower bitrates when stream data is interrupted.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

HTTP adaptive bitrate content delivery solutions may use an encoding device to produce several streams with different encoding parameters simultaneously. In one example, the content delivery may comprise delivering content (e.g., video, audio, audio-video, etc.) to an audience using a plurality of streams (e.g., video streams, audio streams, audio-video streams, etc.) having a variety of encoding schemes (e.g., Pantos HTTP live streaming (HLS) from Apple, Inc., Smooth Streaming from Microsoft Corp., Non-Segmented MPEG2-TS, Dynamic Adaptive Streaming over HTTP (MPEG DASH), etc.). The plurality of streams generally includes, but is not limited to, media streams or IP media streams. In an example embodiment, the present invention generally provides a method and/or architecture for concealment of errors in HTTP adaptive video sets.

Figure 1:
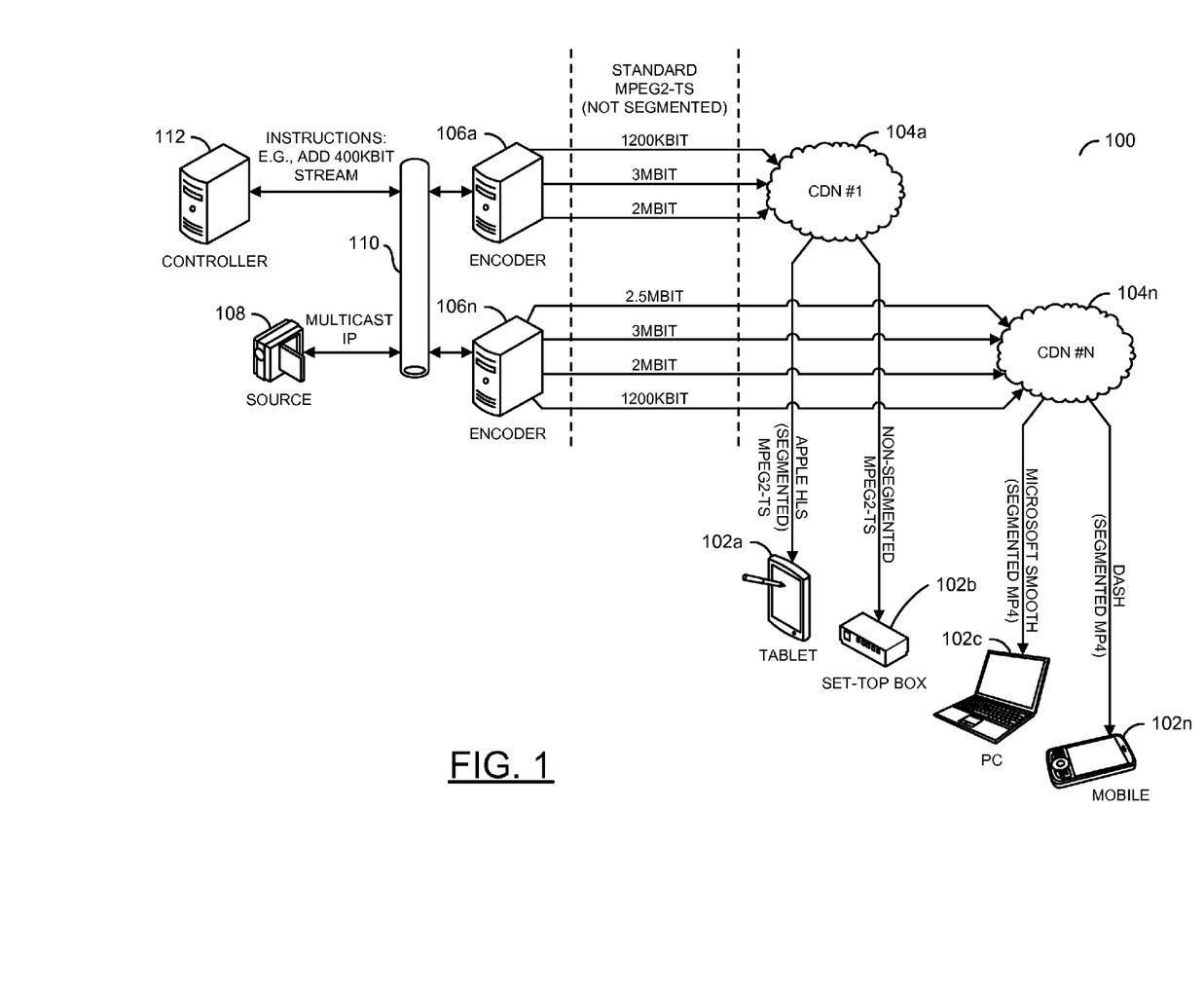
FIG. 1 is a diagram illustrating a system implemented in accordance with an embodiment of the present invention.

Referring to FIG. 1, a diagram of a system 100 is shown illustrating a content distribution system in accordance with an embodiment of the present invention. The system 100 may comprise, in one example, a number of client devices 102a-102n, a number of content delivery (or distribution) networks and/or mobile carriers (CDNs/MCs) 104a-104n, a plurality of encoders 106a-106n, a content source 108, a content provider network 110, and a controller 112. In one example, player applications may reside on the number of client devices 102a-102n. The client devices 102a-102n may include computers, set-top boxes, cellular telephones, smartphones, tablets, and other mobile devices. The client devices 102a-102n may be configured to receive content (e.g., video, audio, audio-video, etc.) from the CDNs/MCs 104a-104n. The client devices 102a-102n may be connected to the CDNs/MCs 104a-104n using wired (e.g., cable, etc.), wireless (e.g., Wi-Fi, satellite, etc.), third generation (3G) links, and/or fourth generation (4G) links. Communication between the client devices 102a-102n and the CDNs/MCs 104a-104n may be handled by protocols including, but not limited to Pantos HTTP live streaming (HLS) from Apple, Inc., Smooth Streaming from Microsoft Corp., Non-Segmented MPEG2 transport stream (MPEG2-TS), and/or Dynamic Adaptive Streaming over HTTP (MPEG DASH). The CDNs/MCs 104a-104n generally implement a method and/or architecture for concealment of errors in HTTP adaptive video sets in accordance with an embodiment of the present invention. In one example, the CDNs/MCs 104a-104n may be implemented using cloud computing resources.

The CDNs/MCs 104a-104n generally make a plurality of streams available to the client devices 102a-102n. The client devices 102a-102n generally select one of the plurality of available streams based on particular capabilities of the client devices 102a-102n. The plurality of streams are generally created by the CDNs/MCs 104a-104n from a plurality of standard MPEG2-TS non-segmented streams. The standard MPEG2-TS streams are generally created by the plurality of encoders 106a-106n. For example, the encoders 106a-106n may encode content received from the source (or content provider) 108. The content may be received via multicast IP on the content provider network 110. However, the content could also be raw video on SDI (serial digital interface), files over FTP (file transport protocol), etc. Parameters used by the encoders 106a-106n in encoding the plurality of streams are generally managed/adjusted by the controller 112 (e.g., via the network 110).

The controller 112 may be configured to control and/or adjust system parameters based upon one or more factors. The factors may include, but are not limited to, maximum quality for a given audience (e.g., highest bitrates at optimal resolutions with smoothest playback), maximum audience size for a given bandwidth allocation or content deliver network/mobile carrier (CDN/MC) cost, and/or minimum set of streams for a given audience. Content delivery networks (CDNs) and mobile carriers (MCs) typically charge customers for the amount of data sent to users. The controller 112 may choose to lower bitrates of some of the streams generated by the encoders 106a-106n to reduce CDN/MC costs. The controller 112 may be configured to limit the decrease in bitrates to only those levels where viewers will not stop watching due to poor quality. If encoding capacity (for live) or stream variant storage (for video on demand (VOD)) is a limiting factor, the system 100 may be configured to adjust the number of streams being created to serve the largest portion of the audience. In a multi-channel environment, adjusting the number of streams may ensure that a limited set of encoding hardware may serve as many channels as possible, while giving the best quality to the most-watched or highest revenue channels.

Figure 2:
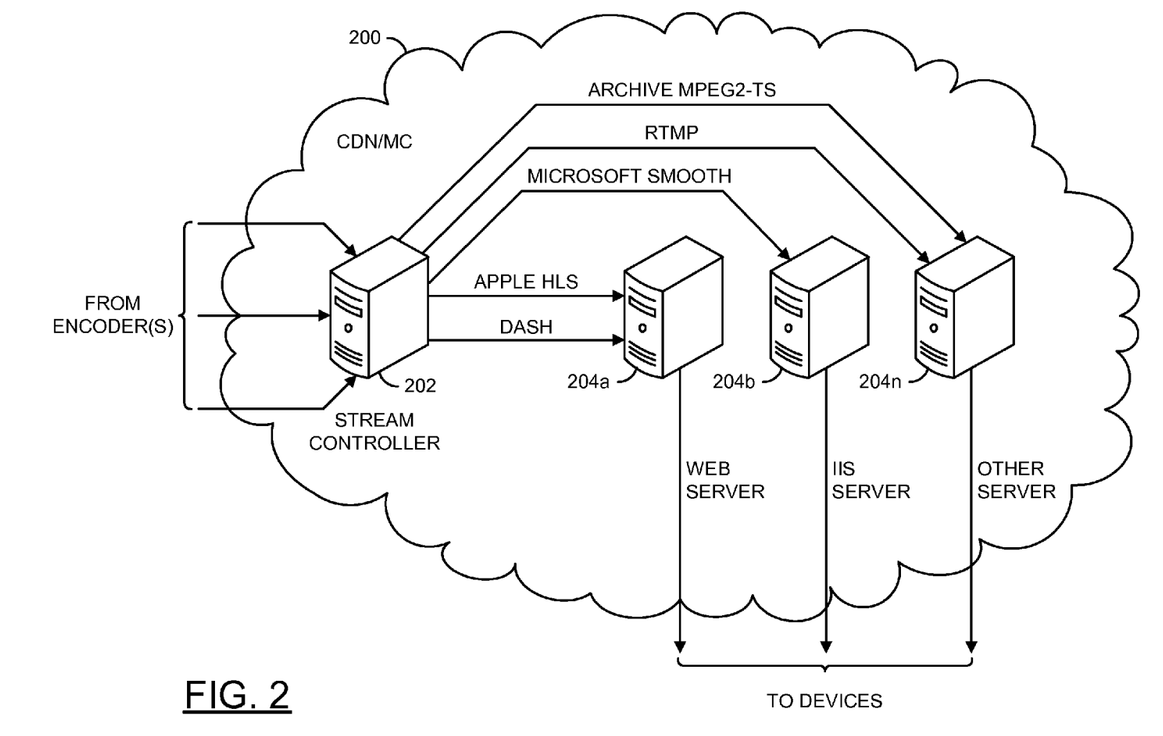
FIG. 2 is a diagram illustrating an example content delivery/distribution network of FIG. 1.

Referring to FIG. 2, a diagram is shown illustrating details of an example content delivery (or distribution) network/mobile carrier (CDN/MC) 200. The CDN/MC 200 may comprise a stream controller 202 and a number of servers 204a-204n. The stream controller 202 is generally configured to provide concealment of errors in HTTP adaptive video sets in accordance with an embodiment of the present invention. The servers 204a-204n may include, but are not limited to Web-Dav servers, RTMP servers, IIS servers, and other HTTP based servers using various communications protocols. In one example, the stream controller 202 may receive a number of input streams (e.g., transport streams) from one or more of the encoders 106a-106n and present a number of output streams to the servers 204a-204n. In one example, the input streams may comprise standard MPEG2-TS non-segmented streams. The output streams may comprise technology including, but not limited to, Apple HLS, Microsoft Smooth Streaming, RTMP, MPEG DASH, Archive MPEG2-TS, etc. The servers 204a-204n are generally configured to generate the various streams available to the client devices 102a-102n in response to the output streams received from the stream controller 202.

The stream controller 202 is generally configured to convert continuous MPEG2 Transport Streams (MPEG2-TS) into a number of output formats (e.g., HTTP adaptive media streams). Depending upon the output formats to be generated, the stream controller 202 may, for example, convert the continuous MPEG2-TS streams by segmenting the data into small chunks. In one example, segments that are two to ten seconds in length may be created. In another example, segments may be five to ten seconds in length. However, other length segments may be generated accordingly to meet the design criteria of a particular implementation.

The segments may, for example, be created in MPEG2-TS, MPEG4 (MP4), and/or other appropriate container based formats. To support playback, the stream controller 202 may generate additional information such as playlist, index, and/or manifest files. The playlist files generally contain information that may be used by a player during playback (e.g., media formats, segment lists, etc.). The index files generally contain information that may be used by a player to perform trick play operations (e.g., fast forward, rewind, slow motion, etc.) without having to retrieve entire segments. The manifest files may be requested by a playback device to determine which media segments are currently available and to retrieve new media segments as needed. The manifest files may contain information that may be used by the playback device to determine when future segments become available without having to re-request the manifest file.

When a particular input stream becomes invalid or unavailable, the stream controller 202 automatically switches to an input stream with a lower bitrate and/or resolution in order to maintain the output stream(s) associated with the invalid input stream. When the particular input stream becomes valid again, the stream controller 202 automatically switches back to the now valid stream to continue generating the output stream(s). By automatically switching to another input stream when a stream becomes invalid, the stream controller 202 generally allows end-users to view programming without interruption and without having to rely on a playback device being capable of seamlessly switching to lower bitrates when stream data is interrupted.

A transport stream is generally considered invalid when any one of the following conditions occurs within a predetermined period of time (e.g., 2-10 seconds):

a. the transport stream ceases to be received;
b. the continuity counter of the current transport stream does not contain an expected value (e.g., a continuity counter with a 4-bit value should always increment by one and wrap to zero after 15);
c. the demultiplexer is unable to demultiplex the elementary video stream due to a change or changes in the transport stream (e.g. the video stream PID changed without a corresponding change in the Program Map Table);
d. the time stamp(s) (e.g., PTS/DTS) of a current decoded video frame is (are) not within an expected tolerance (e.g., 2-10 seconds) of the related transport stream(s);
e. the program clock reference (PCR) of transport stream is not within an expected tolerance (e.g., 2-10 seconds) of the related transport stream(s);
f. the controller is unable to decode Network Abstraction Layer (NAL) units from the demultiplexed H.264 video frame data; and/or
g. the time stamps (e.g., PTS/DTS) of a decoded instantaneous decoder refresh (IDR) frame of the current stream does not match the PTS/DTS of a decoded IDR frame of the related transport stream(s).

In general, all of the above items may be applied to video streams, and, except for item "g", may also be applied to audio streams.

In a first example, an operation of the stream controller 202 may use a predetermined tolerance period of five seconds. An elementary stream being demultiplexed may have a PID with a value of 0x0100. If the value of the continuity counter of the last MPEG-2 transport stream packet for PID 0x0100 was 4 and the value of the continuity counter of the next packet with PID 0x0100 is 10, the controller 202 would ignore the subsequent MPEG-2 transport stream packets because the expected value of the continuity counter of the next packet with PID 0x0100 is 5. The controller 202 would continue to ignore the MPEG-2 transport stream packets until the continuity counter value of at least two consecutive packets had expected values.

In a second example, a program association table contains one program, the Program Map Table PID has a value of 0x0030, the Program Map Table contains one stream, the Elementary_PID has a value of 0x100, and the stream type is MPEG-2 Video. If the PID used to identify the elementary stream changes from 0x100 to 0x102, but the Elementary_PID in the Program Map Table does not change, the demultiplexer would be unable to demultiplex the video stream until either: 1) a revised program map table is received containing a changed value (e.g., 0x200) for the Elementary_PID or 2) the PID used to identify the elementary stream changes back to 0x100.

In a third example, an operation of the stream controller 202 may again use a predetermined tolerance period of five seconds. The PTS of a current decoded video frame is 900000 (10.0 seconds). The PTSs of all related transport streams are within 2 seconds of this value. If the PTS of the next decoded video frame changes to 2700000 (30.0 seconds), the video stream is ignored because the change is greater than 20 seconds. The video stream would continue to be ignored until the PTS is back within the predetermined tolerance of 5 seconds of the related transport streams.

A transport stream may be considered valid when all of the conditions a-g are not met. However, if related multiple transport streams are not meeting item "d" and/or item "e" above, then the largest group of transport streams that match the predetermined tolerance may be considered valid. For example, using a predetermined tolerance period of five seconds, for five streams having the following PTS times:

Stream #1 PTS=990000 (11.0 seconds),
Stream #2 PTS=1080000 (12.0 seconds),
Stream #3 PTS=2700000 (30.0 seconds),
Stream #4 PTS=900000 (10.0 seconds),
Stream #5 PTS=2790000 (31.0 seconds), the three streams that are within the predetermined tolerance of each other (e.g., streams #1, #2 and #4) are generally considered to be the valid streams.

Figure 3:
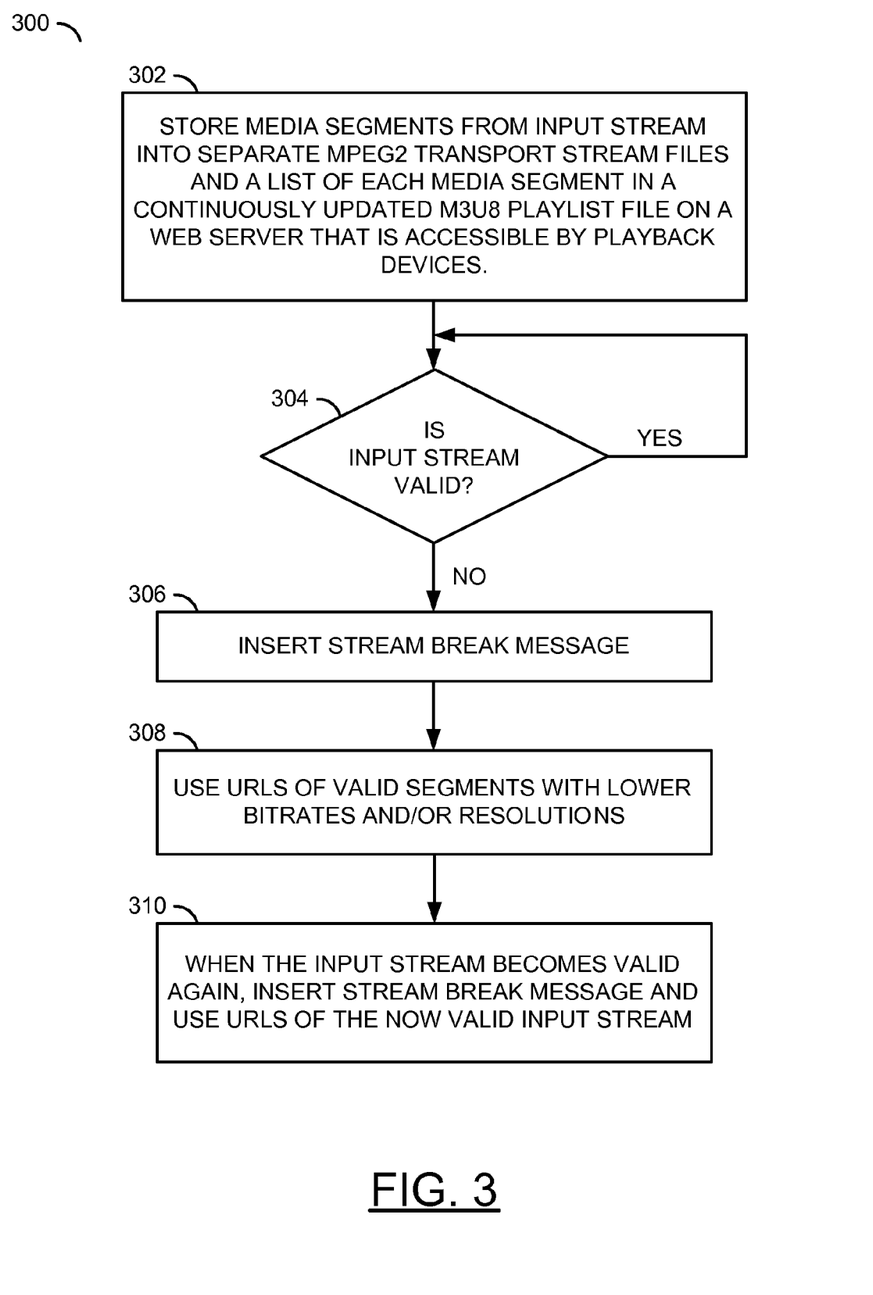
FIG. 3 is a flow diagram illustrating a process in accordance with an embodiment of the present invention used in conjunction with Apple HTTP Live streaming (HLS)

Referring to FIG. 3, a flow diagram is shown illustrating a process 300 in accordance with an embodiment of the present invention used in conjunction with Apple HLS adaptive streaming.

In one example, the process (or method) 300 may comprise a step (or state) 302, a step (or state) 304, a step (or state) 306, a step (or state) 308, and a step (or state) 310. In the step 302, the process 300 may store media (e.g. audio content, video content, audio-video content, etc.) into separate MPEG2 Transport Stream files. The separate MPEG2 Transport Stream files may, in one example, be five to ten seconds in length. The media files are known as media segments. A list of each media segment is stored in a continuously updated playlist file (e.g., a m3u8 playlist file). The media segments and m3u8 playlist file are stored on a web server, accessible by playback devices. Playback devices continuously reload the playlist file and retrieve new media segments as needed. The media segments are played back-to-back without gaps to create a viewable stream without interruptions.

In the step 304, the process 300 checks to determine whether the input stream from which the media segments are being generated is valid. When the input stream is valid, the process 300 continues using the input stream to generate the media segments. If the input stream becomes invalid, the process 300 moves to the step 306. The input stream may be considered invalid based upon the criteria described above. In the step 306, process 300 modifies the playlist file for the bitrate and/or resolution that is no longer valid by inserting a stream break message and moves to the step 308. In the step 308, the process 300 modifies the playlist file for the bitrate and/or resolution that is no longer valid by using pointers (e.g., URLs) to valid segments with lower bitrates and/or resolutions to maintain the output stream(s) to the playback device(s). When the input stream that was invalid becomes valid again, the process 300 may move to the step 310. In the step 310, the process 300 modifies the playlist file for the bitrate and/or resolution that is again valid by inserting a stream break message and using segments from the now valid stream to generate the output stream to the playback device(s). The process 300 generally runs continuously for the duration of the event.

Figure 4:
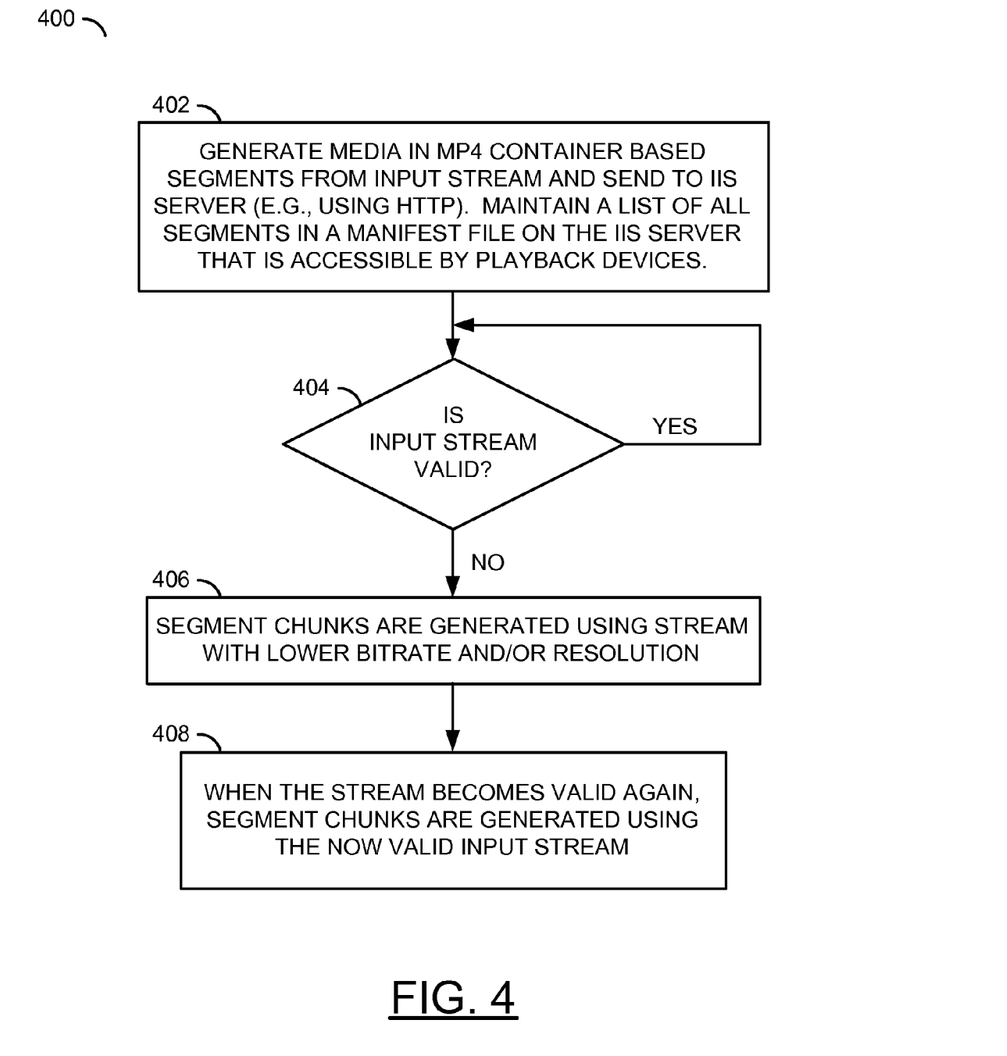
FIG. 4 is a flow diagram illustrating a process in accordance with an embodiment of the present invention used in conjunction with Microsoft Smooth adaptive streaming.

Referring to FIG. 4, a flow diagram is shown illustrating a process 400 in accordance with an embodiment of the present invention used in conjunction with Microsoft Smooth adaptive streaming. In one example, the process (or method) 400 may comprise a step (or state) 402, a step (or state) 404, a step (or state) 406, and a step (or state) 408. In the step 402, the process 400 may generate media (e.g. audio content, video content, audio-video content, etc.) in MP4 container based segments. The MP4 container based segments may, for example, be five to ten seconds in length. The MP4 container based segments may be sent to an IIS Server using the HTTP communication protocol. The IIS Server may parse each segment and maintain a list of all segments received in a format known as a Manifest. The playback device may request the Manifest at any time to determine which media segments are currently available and retrieve new media segments as needed. The Manifest may contain information that may be used by the playback device to determine when future segments become available without having to re-request the Manifest. The media segments are generally played back-to-back without gaps to create a viewable stream without interruptions.

In the step 404, the process 400 checks to determine whether the input stream from which the media segments are being generated is valid. When the input stream is valid, the process 400 continues using the input stream to generate the media segments. If the input stream becomes invalid, the process 400 moves to the step 406. The input stream may be considered invalid based upon the criteria described above. In the step 406, process 400 modifies the output of segment chunks by generating the segment chunks using a stream with a lower bitrate and/or resolution. When the input stream that was invalid becomes valid again, the process 400 may move to the step 408. In the step 408, the process 400 modifies the output of segment chunks by generating the segment chunks using the now valid input stream. The process 400 generally runs continuously for the duration of the event. If the selected backup stream becomes invalid, the next lower bitrate and/or resolution stream may be used. For Microsoft Smooth Streaming, when the stream data is switched to a lower bitrate and/or resolution stream, the US server does not alter the manifest of the selected stream. The switch to a different bitrate and/or resolution is performed on a fragment boundary. Switching on the fragment boundary allows a player to continue to play the stream without any interruptions.

Figure 5:
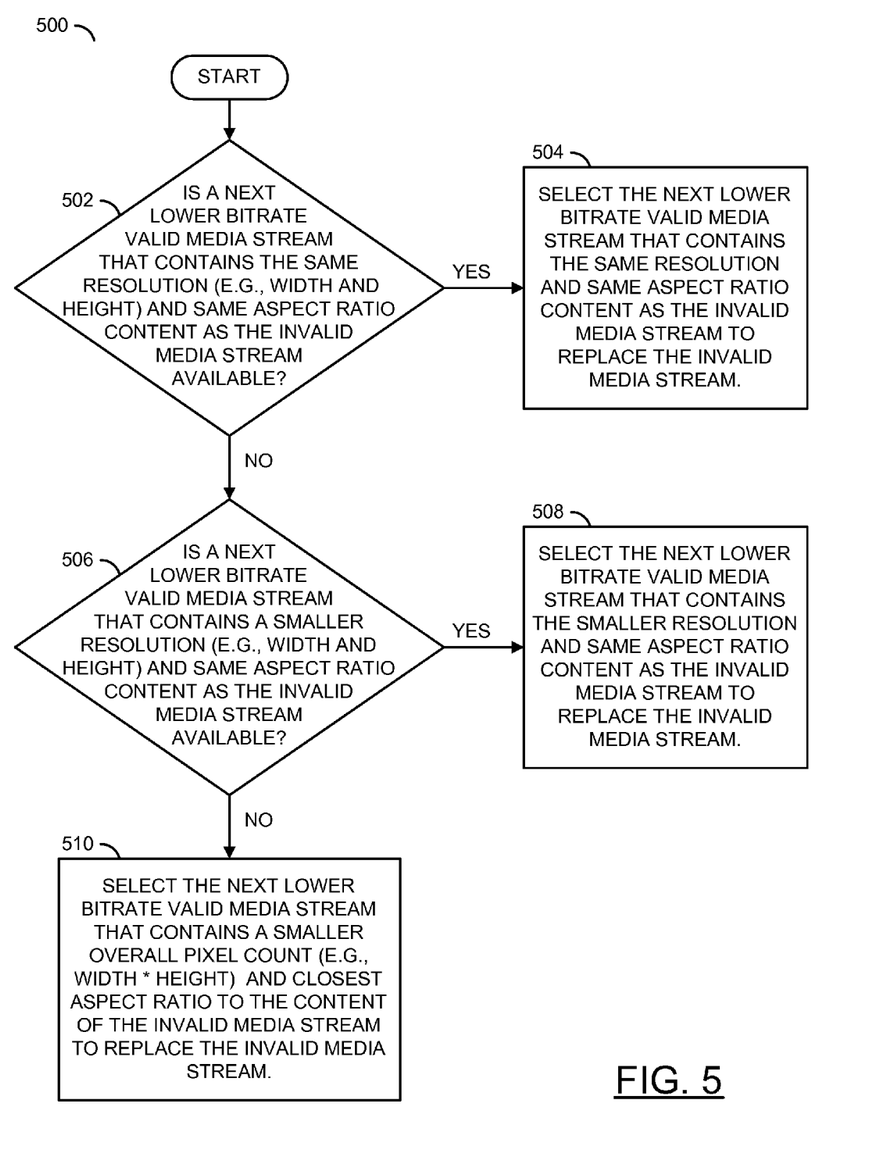
FIG. 5 is a flow diagram illustrating a process for selecting a replacement stream in accordance with an embodiment of the present invention.

Referring to FIG. 5, a flow diagram is shown illustrating a process 500 in accordance with an embodiment of the present invention. The process 500 may be implemented to determine the concealment media stream to be used to replace an invalid stream. In general, the optimum concealment media stream contains the same resolution and aspect ratio as the original (invalid) stream. In one example, the process (or method) 500 may comprise a step (or state) 502, a step (or state) 504, a step (or state) 506, a step (or state) 508, and a step (or state) 510. In the step 502, the process 500 may determine whether a next lower bitrate valid media stream that contains the same resolution (e.g., width and height) and same aspect ratio content as the invalid media stream is available. If so, the process 500 moves to the step 504 where the next lower bitrate valid media stream containing the same resolution and same aspect ratio content as the invalid stream is selected for use. If a next lower bitrate valid media stream containing the same resolution and the same aspect ratio content as the invalid media stream is not available, the process 500 may move to the step 506. In the step 506, the process 500 determines whether a next lower bitrate valid media stream with a smaller resolution (e.g., width and height) and the same aspect ratio as the invalid media stream is available. If so, the process 500 may move to the step 508 where the next lower bitrate valid media stream with the smaller resolution and the same aspect ratio content as the invalid media stream is selected for use. If a next lower bitrate valid media stream containing a smaller resolution and the same aspect ratio content as the invalid media stream is not available, the process 500 may move to the step 510 where a next lower bitrate valid media stream with a smaller overall total pixel count (e.g., width*height) and closest aspect ratio to the invalid media stream is selected for use.

The term manifest is used herein to refer generally to manifest files, as found in Apple HLS and Microsoft Smooth specifications, and the Media Presentation Description or MPD, as found in the MPEG DASH specification.

The functions performed by the diagrams of FIGS. 3-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A system comprising:
   one or more stream sources configured to generate a plurality of input streams containing a given content at a plurality of bitrates, a plurality of resolutions, or a plurality of bitrates and resolutions; and
   a stream controller configured to generate a plurality of output streams in response to the plurality of input streams, wherein said stream controller is further configured to (i) determine when one of the plurality of input streams becomes invalid, (ii) switch generation of an output stream associated with the invalid input stream from the invalid input stream to a valid one of the plurality of input streams, and (iii) when the invalid input stream becomes valid again, switch the generation of the output stream back to the now valid input stream.

2. The apparatus according to claim 1, wherein said plurality of input streams comprise transport streams and said stream controller is further configured to identify a transport stream as invalid in response to at least one of the following conditions occurring:
   a. the transport stream ceases to be received;
   b. a continuity counter of the transport stream does not contain an expected value;
   c. a demultiplexer of said stream controller is unable to demultiplex an elementary video stream of the transport stream due to a change or changes in the transport stream;
   d. one or more time stamps of a current decoded video frame is not within an expected tolerance of one or more related transport streams;
   e. a program clock reference (PCR) of the transport stream is not within an expected tolerance of the one or more related transport streams;
   f. said stream controller is unable to decode Network Abstraction Layer (NAL) units from demultiplexed H.264 video frame data; and
   g. at least one time stamp of a decoded instantaneous decoder refresh (IDR) frame of the transport stream does not match a corresponding time stamp of a decoded IDR frame of the one or more related transport streams.

3. The apparatus according to claim 1, wherein the valid input stream to which the stream controller switches in response to an input stream being identified as invalid comprises one of (i) a next lower bitrate valid transport stream that contains same resolution and same aspect ratio content as the invalid input stream, (ii) a next lower bitrate valid transport stream with a smaller resolution and the same aspect ratio as the invalid input stream, and (iii) a next lower bitrate valid transport stream with a smaller overall total pixel count and closest aspect ratio to the invalid input stream.

4. The apparatus according to claim 1, wherein the stream controller is further configured to:
  determine whether a next lower bitrate valid transport stream that contains same resolution and same aspect ratio content as the invalid input stream is available and, if so, select the next lower bitrate valid transport stream containing the same resolution and the same aspect ratio content as the invalid input stream to replace the invalid input stream;
  if a next lower bitrate valid transport stream containing the same resolution and the same aspect ratio content as the invalid input stream is not available, determine whether a next lower bitrate valid transport stream with a smaller resolution and the same aspect ratio as the invalid input stream is available and, if so, select the next lower bitrate valid transport stream with the smaller resolution and the same aspect ratio content as the invalid input stream to replace the invalid input stream; and
  if a next lower bitrate valid transport stream containing a smaller resolution and the same aspect ratio content as the invalid input stream is not available, select a next lower bitrate valid transport stream with a smaller overall total pixel count and closest aspect ratio to the invalid input stream to replace the invalid input stream.

5. The apparatus according to claim 1, wherein said stream controller is configured to generate one or more types of streams selected from the group consisting of Apple HTTP Live Streaming (HLS), Microsoft Smooth Streaming, Dynamic Adaptive Streaming over HTTP (MPEG DASH), RTMP, MPEG4, and MPEG2 Transport Streams.

6. The apparatus according to claim 1, wherein said input streams comprise continuous MPEG2 Transport Streams (MPEG2-TS) and said stream controller is configured to segment data carried on one or more of the input streams into chunks for transmission on one or more of the output streams.

7. The apparatus according to claim 1, wherein said content comprises video, audio, or video and audio material for an event.

8. The apparatus according to claim 1, wherein said stream controller is part of a content delivery network.

9. The apparatus according to claim 1, wherein said stream controller is part of a mobile carrier network.

10. A system comprising:
  means for generating a plurality of input streams containing a given content at a plurality of bitrates, a plurality of resolutions, or a plurality of bitrates and resolutions; and
  means for generating a plurality of output streams in response to the plurality of input streams, wherein said means for generating said plurality of output streams is further configured to (i) determine when one of the plurality of input streams becomes invalid, (ii) switch generation of an output stream associated with the invalid input stream from the invalid input stream to a valid one of the plurality of input streams, and (iii) when the invalid input stream becomes valid again, switch the generation of the output stream back to the now valid input stream.

11. A method for providing concealment of errors in HTTP adaptive video sets comprising the steps of:
  receiving a plurality of input streams containing a given content at a plurality of bitrates, a plurality of resolutions, or a plurality of bitrates and resolutions;
  generating a plurality of output streams in response to the plurality of input streams;
  determining when one of the plurality of input streams becomes invalid;
  switching generation of an output stream associated with the invalid input stream from the invalid input stream to a valid one of the plurality of input streams; and
  when the invalid stream becomes valid again, switching the generation of the output stream back to the now valid input stream.

12. The method according to claim 11, wherein said plurality of input streams comprise transport streams and further comprising identifying a transport stream as invalid in response to at least one of the following conditions occurring:
  a. the transport stream ceases to be received;
  b. a continuity counter of the transport stream does not contain an expected value;
  c. a demultiplexer of said stream controller is unable to demultiplex an elementary video stream of the transport stream due to a change or changes in the transport stream;
  d. one or more time stamps of a current decoded video frame is not within an expected tolerance of one or more related transport streams;
  e. a program clock reference (PCR) of the transport stream is not within an expected tolerance of the one or more related transport streams;
  f. said stream controller is unable to decode Network Abstraction Layer (NAL) units from demultiplexed H.264 video frame data; and
  g. at least one time stamp of a decoded instantaneous decoder refresh (IDR) frame of the transport stream does not match a corresponding time stamp of a decoded IDR frame of the one or more related transport streams.

13. The method according to claim 11, wherein the valid stream to which generation of the output stream associated with the invalid input stream is switched comprises one of (i) a next lower bitrate valid transport stream that contains same resolution and same aspect ratio content as the invalid input stream, (ii) a next lower bitrate valid transport stream with a smaller resolution and the same aspect ratio as the invalid input stream, and (iii) a next lower bitrate valid transport stream with a smaller overall total pixel count and closest aspect ratio to the invalid input stream.

14. The method according to claim 11, further comprising:
  determining whether a next lower bitrate valid transport stream that contains same resolution and same aspect ratio content as the invalid input stream is available and, if so, selecting the next lower bitrate valid transport stream containing the same resolution and the same aspect ratio content as the invalid input stream to replace the invalid input stream;
  if a next lower bitrate valid transport stream containing the same resolution and the same aspect ratio content as the invalid input stream is not available, determining whether a next lower bitrate valid transport stream with a smaller resolution and the same aspect ratio as the invalid input stream is available and, if so, selecting the next lower bitrate valid transport stream with the smaller resolution and the same aspect ratio content as the invalid input stream to replace the invalid input stream; and if a next lower bitrate valid transport stream containing a smaller resolution and the same aspect ratio content as the invalid input stream is not available, selecting a next lower bitrate valid transport stream with a smaller overall total pixel count and closest aspect ratio to the invalid input stream to replace the invalid input stream.

15. The method according to claim 11, further comprising: generating the plurality of input streams using one or more encoders.

16. The method according to claim 11, further comprising: transmitting the plurality of output streams to a plurality of media servers.

17. The method according to claim 11, wherein said plurality of input streams comprise MPEG2 transport streams and said plurality of output streams comprise one or more types of streams selected from the group consisting of Apple HTTP Live Streaming (HLS), Microsoft Smooth Streaming, Dynamic Adaptive Streaming over HTTP (MPEG DASH), RTMP, MPEG4, and MPEG2 Transport Streams.

18. The method according to claim 11, further comprising: segmenting data carried on one or more of the input streams into chunks for transmission on one or more of the output streams, wherein said input streams comprise continuous MPEG2 transport streams.

19. The method according to claim 11, wherein the steps are preformed by processor executable instructions contained within a computer readable medium.

* * * * *